United States Patent [19]

Sano et al.

[11] Patent Number: 4,522,417
[45] Date of Patent: Jun. 11, 1985

[54] STEERING SYSTEM FOR VEHICLES

[75] Inventors: Shoichi Sano, Tokyo; Yoshimi Furukawa, Saitama, both of Japan

[73] Assignee: Honda Giken Kogyo Kabushiki Kaisha, Tokyo, Japan

[21] Appl. No.: 544,438

[22] Filed: Oct. 21, 1983

[30] Foreign Application Priority Data

Oct. 22, 1982 [JP] Japan ................................. 57-185495
Oct. 29, 1982 [JP] Japan ................................. 57-190379
Nov. 4, 1982 [JP] Japan ................................. 57-194374

[51] Int. Cl.³ ............................................. B62D 7/00
[52] U.S. Cl. ......................................... 280/91; 280/96
[58] Field of Search ............... 180/140, 234, 236, 240;
280/771, 91, 95 R, 95 A, 96, 98, 99, 103; 74/39,
40, 42, 43, 50, 89, 89.16, 89.2, 496, 498

[56] References Cited

U.S. PATENT DOCUMENTS 3,596,730 8/1971 Cecce ..................................... 280/91
3,617,071 11/1971 Ivancic ................................... 280/96
4,406,472 9/1983 Furukawa ........................... 280/96.1

FOREIGN PATENT DOCUMENTS 2934730 7/1980 Fed. Rep. of Germany ........ 280/91

Primary Examiner—Joseph F. Peters, Jr.
Assistant Examiner—Ross Weaver
Attorney, Agent, or Firm—Irving M. Weiner; Pamela S. Burt

[57] ABSTRACT

A steering system for a vehicle having front and rear wheels. The steering system includes a steering wheel, a front wheel steering sub-system for steering the front wheels in accordance with the steering angle of the steering wheel, an angle take-out mechanism for taking out from the front wheel steering sub-system an angular displacement according to the steering of the steering wheel, and a pair of rear wheel turning mechanisms for respectively turning the rear wheels in accordance with two linear displacements, respectively, substantially in the transverse direction of the vehicle. Further, the steering system is provided with a function generating mechanism for generating a compound function of the angular displacement to determine the linear displacements.

Favorable accommodation is achieved with respect to the peculiarity of the rear wheel steering.

9 Claims, 15 Drawing Figures

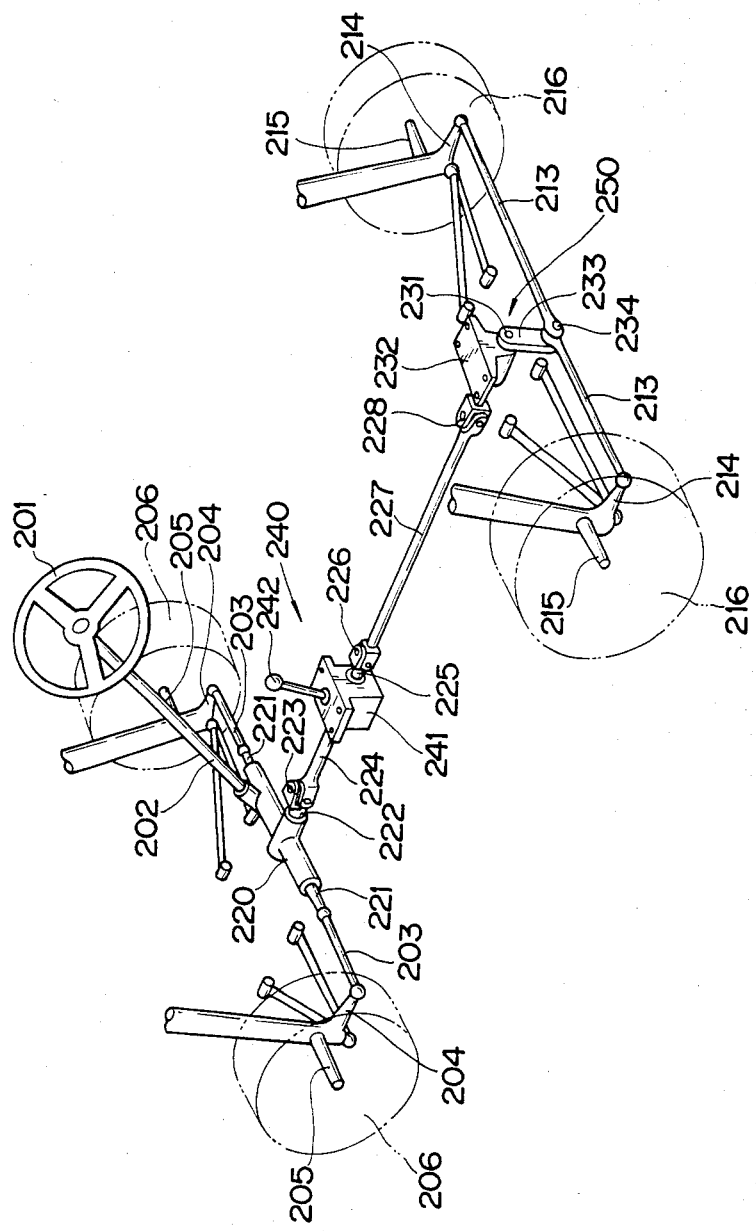

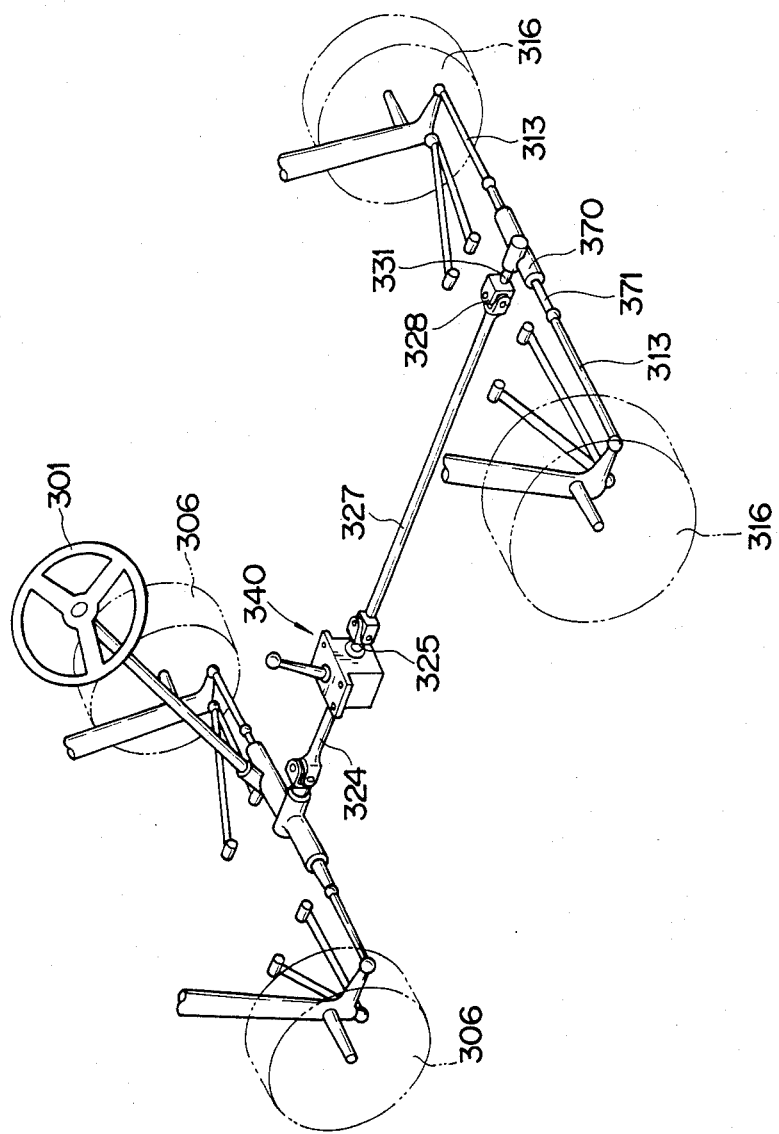

STEERING SYSTEM FOR VEHICLES

BACKGROUND OF THE INVENTION

1. Field of the Invention

The present invention relates to a steering system for vehicles. Particularly, it relates to a steering system for a vehicle having front and rear wheels, in which the rear wheels as well as the front wheels are steerable by steering a means of wheel.

2. Description of Relevant Art

There have been proposed steering systems for vehicles, such as in Japanese Patent Application Nos. 56-118698 and 57-47743, in which a rear wheel steering sub-system is provided with a crank member, such as a pivotable link or an off-centered pin, capable of a circular motion, and with a linkage member for transmitting an angular displacement taken out in accordance with the steering of a steering wheel from a front wheel steering sub-system to the crank member, to thereby rotate the crank member. A transverse linear displacement subjected substantially to a sine function is obtained therefrom, to thereby steer both rear wheels concurrently with the front wheels.

With such a steering system, for a vehicle having front and rear wheels, the rear wheels are able to be steered in the same direction as the front wheels for relatively small steering angles of a steering wheel and in the opposite direction thereto for relatively large steering angles thereof. Accordingly, there is provided favorable vehicle maneuverability when travelling at relatively high speeds, as well as favorable vehicle turning characteristics due to relatively small turning radii possible with large steering angles, so as to facilitate implementing a U-turn and steering in and out of a parking space.

However, with such a conventional steering system, the relation between the steered angle of both rear wheels and the steering angle of a steering wheel is substantially bound to a simple sine function, thus being unable to sufficiently accommodate the peculiarity of the rear wheel steering.

For example, the maximum steered angle of the rear wheels, as steered in the same direction as the front wheels, becomes the same as that when the rear wheels are steered in the opposite direction to the front wheels, while the latter is generally desired to be larger.

Moreover, for the rear wheel steering, it is fundamentally desirable to provide a voluntary selection of the steered angle ratio as well as the steering direction of the rear wheels relative to the front wheels in accordance with various steering situations such as when parking, cruising at relatively low speeds along narrow curves and travelling at considerably high speeds, or to suit the taste of individual drivers.

Further, even in a steering system with which both front and rear wheels are steerable in proportion to the steering angle of a steering wheel, it is also desirable to provide voluntary selection of the rear wheels steering mode, such as in accordance with the steering situation or the taste of the driver.

Incidentally, it is known with respect to the rear wheels of a turning vehicle, that the wheel at the outer side with respect to the turning has a greater effect on the maneuverability of the vehicle than the other one at the inner side.

In this connection, for conventional steering systems, still more desired is the possibility of steering either rear wheel, as located at the outer side in each vehicle-turning operation, by larger angles than the other one at the inner side.

The present invention has been achieved to effectively satisfy such desires for conventional steering systems for vehicles.

SUMMARY OF THE INVENTION

According to the present invention, there is provided a steering system for a vehicle having front and rear wheels, comprising a steering wheel, a front wheel steering sub-system for steering the front wheels in accordance with the steering angle of the steering wheel, an angle take-out mechanism for taking out from the front wheel steering sub-system an angular displacement according to the steering of the steering wheel, a pair of rear wheel turning mechanisms for respectively turning the rear wheels, in accordance with two linear displacements, respectively, substantially in the transverse direction of the vehicle, and a function generating mechanism for generating a compound function of the angular displacement to determine the linear displacements.

Accordingly, an object of the present invention is to provide a steering system for vehicles, which favorably accommodates the peculiarity of the rear wheel steering.

In the above steering system, the two linear displacements may be equal to each other, while the compound function may be the sum of a sine function and a function of second order.

In this respect, another object of the present invention is to provide a steering system for a vehicle having front and rear wheels, which enables the maximum steered angle of the rear wheels, as steered in the same direction as the front wheels, to be set larger than that when the rear wheels are steered in the opposite direction to the front wheels.

Moreover, the compound function may be the compound of a set of various sine or first-order functions with a select function, while the two linear displacements are again assumed to be equal to each other.

In this respect, still another object of the present invention is to provide a steering system for a vehicle having front and rear wheels, which permits a voluntary selection of the steered angle ratio as well as the steering direction of the rear wheels relative to the front wheels in accordance with various steering situations or the taste of individual drivers.

Further, the two linear displacements may have a difference therebetween predetermined, and the compound function may be the sum of a sine function and a function of first order.

In this respect, yet another object of the present invention is to provide a steering system for a vehicle having front and rear wheels, which can steer either of the rear wheels, as located at the outer side in each turning operation of the vehicle, by larger angles than the other thereof at the inner side.

The above and further features, objects and advantages of the present invention will more fully appear from the following detailed description of the preferred embodiments of the invention when the same is read in conjunction with the accompanying drawings.

BRIEF DESCRIPTION OF THE DRAWINGS

FIG. 6 is a perspective view of a steering system for vehicles according to a second embodiment of the invention.

FIG. 9 is a perspective view of another steering system for vehicles according to the second embodiment.

DETAILED DESCRIPTION OF THE PREFERRED EMBODIMENTS

Figure 1:
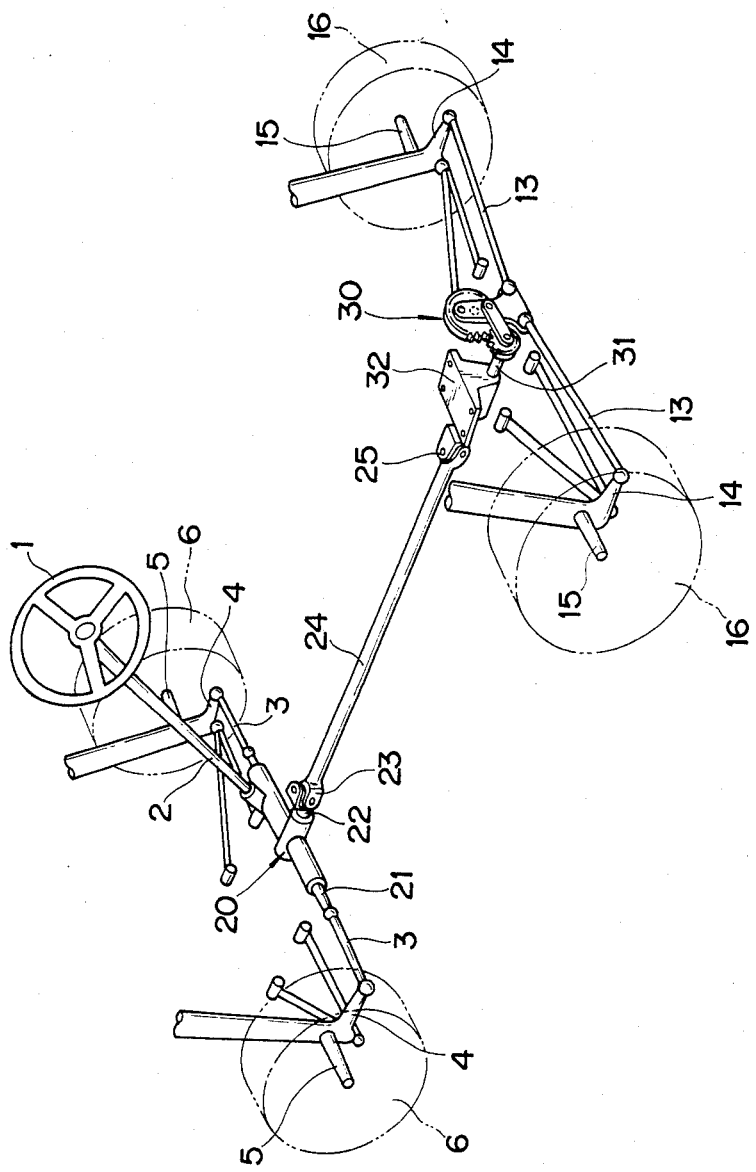
FIG. 1 is a perspective view of a steering system for vehicles according to a first embodiment of the invention.

Referring first to FIG. 1, designated at reference numeral 1 is a steering wheel. The steering wheel 1 is provided with a steering shaft 2 assembled at the distal end thereof in a front wheel steering gearbox 20 of a rack and pinion type. In the gearbox 20, the steering shaft 2 has at the distal end a drive pinion (not shown) secured thereto and engaged with the right-half part of a rack (not shown) formed on a rack shaft 21. The rack shaft 21 is projected at either end thereof from both sides of the front steering gearbox 20 and connected to respective inner ends of a pair of tie rods 3, 3, each respectively connected at the outer end thereof to one of a pair of knuckle arms 4, 4 which have their axle shafts 5, 5 projecting outwardly and respectively supporting a pair of front wheels 6, 6.

The steering of the front wheels 6, 6 is effected by operating the steering wheel 1. Namely, as the steering shaft 2 rotates with the steering wheel 1, the steering rotation is converted, through the engagement between the drive pinion and the rack, into a transverse movement of the rack shaft 21 with respect to the gearbox 20, which makes, through the tie rods 6, 6, the knuckle arms 4, 4 turn transversely, thereby steering the front wheels 6, 6.

The rack is further engaged at the left-half part thereof with a driven pinion (not shown) constituting an angle take-out mechanism with a pinion shaft 22 to which the driven pinion is secured. As will be understood, the angle take-out mechanism is employed for taking out from the above-described front wheel steering sub-system an angular displacement according to the steering of the steering wheel 1. In place of this mechanism, there may be employed any other mechnanism suitable for such purpose.

The pinion shaft 22, projecting rearwardly from the gearbox 20, is connected at the rear end thereof through a universal joint 23 to the front end of a relatively long link shaft 24 which is in turn connected at the rear end thereof through a universal joint 25 to the front end of an input shaft 31 of a rear wheel steering gear assembly 30 constituting a function generating mechanism for generating a compound function of the angular displacement to provide a pair of transverse linear displacements, the compound function being the sum of a sine function and a function of second order, as later described. The input shaft 31 is a rotatable member supported by a bearing bracket 32 and disposed in the rear part of a vehicle body (not shown) at a position somewhat leftwardly distant from an imaginary half-cut plane, extending longitudinally and vertically, of the vehicle body.

Figure 2:
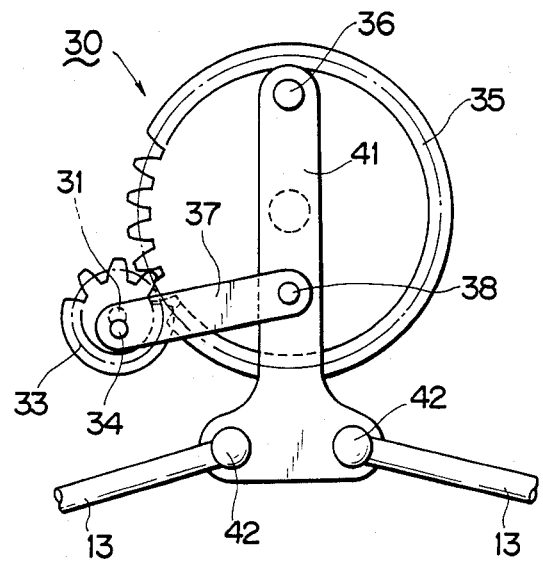
FIG. 2 is an enlarged rear view of a rear wheel steering gear assembly of the steering system of FIG. 1.

Referring now to FIG. 2, the rear wheel steering gear assembly 30 has a drive gear 33, of a relatively small tooth pitch circle diameter, secured to the rear end of the input shaft 31 and provided on the back with an off-centered pin 34 projecting rearwardly therefrom. Meshing with the drive gear 33 is a driven gear 35, of a relatively large tooth pitch circle diameter, having its axis of rotation in alignment with a horizontal line on the above-mentioned imaginary half-cut plane of the vehicle body. Also, the driven gear 35 is provided on the back thereof with an off-centered pin 36 projecting rearwardly therefrom, and supported by another bearing bracket (not shown) in a shaft bearing manner. On the off-centered pin 36 secured to the driven gear 35, there is pivoted the upper end of a swing arm 41 having at the longitudinally intermediate part thereof another pivot pin 38 which pivotally supports the right end of a connecting rod 37 further pivoted at the left end thereof on the off-centered pin 34 secured to the drive gear 33. The swing arm 41 is arranged so as to have an upright initial position with its center line lying on the imaginary half-cut plane, with the steering wheel 1 in its initial or neutral position, holding a pair of rear wheels 116, 116 in their initial positions. In such initial state, the off-centered pin 34 is located right under the axis of rotation of the drive gear 33, while the off-centered pin 36 is positioned right above that of the driven gear 35. The swing arm 41, pivotally supported with the pins 36, 38 at two points vertically spaced from each other, is provided at the lower end thereof with a pair of ball joints 42, 42 for interconnectingly supporting respective inner ends of left and right tie rods 13, 13 as a pair of output members of the rear wheel steering gear assembly 30. In this embodiment, the gear ratio of the driven gear 35 to the drive gear 33 is set at 4:1.

Again referring to FIG. 1, the tie rods 13, 13 are each respectively connected at the outer end thereof to one of a pair of knuckle arms 14, 14 having their axle shafts 15, 15 projecting outwardly and respectively supporting a pair of rear wheels 16, 16. Moreover, the front wheel steering gearbox 20 is secured to the vehicle body.

In the above arrangement, when the steering wheel 1 is operated to be steered, the rack shaft 21 will move transversely through the gearbox 20. Accordingly, through the pinion shaft 22 rotating with the driven pinion engaged with the left half part of the rack, there will be taken out the angular displacement be transmitted through the link shaft 24 to, thereby rotating, to the input shaft 31 of the rear wheel steering gear assembly 30.

In accordance with the rotation of the input shaft 31, the drive gear 33 secured thereto will rotate in either rotating direction and the driven gear 35 will rotate in the opposite direction thereto. As a result, the off-centered pin 34 initially positioned right under the axis of the drive gear 33 and the off-centered pin 36 initially positioned right above that of the driven gear 35 will be rotated in opposite directions to each other at relatively different angular velocities.

Figure 3:
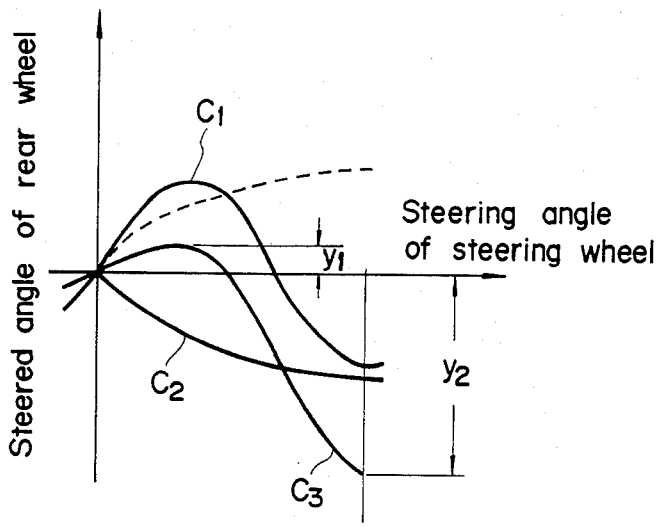
FIG. 3 is a graph for the explanation of a compound function generated at the rear wheel steering gear assembly of FIG. 2.

Referring now to FIG. 3, the ordinate represents a steered angle of the rear wheels 16, 16 and the abscissa represents a steering angle of the steering wheel 1. Further to the above description of the movement of the off-centered pins 34, 36, the swing arm 41, which is pivotally connected at the intermediate part by the pivot pin 38 to the right end of the connecting rod 37 further pivoted at the left end on the off-centered pin 34 of the drive gear 33, will swing about the off-centered pin 36 of the driven gear 35, assumed to be an upper immobile fulcrum. There is thus caused respective transverse linear displacements of the outer ends of the left and right tie rods 13, 13, which are interconnectedly supported at the inner ends thereof by the lower end of the swing arm 41, thereby steering the rear wheels 16, 16 as shown by a sine curve $C_1$. On the other hand, when assuming the pivot pin 38 as a lower immobile fulcrum, the swing arm 41, which is pivoted at the upper end on the off-centered pin 36 of the driven gear 35, will swing about the pivot pin 38, thus steering the rear wheels 16, 16 as shown by a parabolic curve $C_2$.

In this connection, because the gear ratio of the driven gear 35 to the drive gear 33 is set at 4:1, the off-centered pin 36 of the driven gear 35 will move to either the left or right at a progressively decreasing speed till the drive gear 33 makes three-fourth revolution. On the other hand, the connecting rod 37 will move in the same direction as the off-centered pin 36 of the driven gear 35 at a progressively decreasing speed till the drive gear 33 makes one-fourth revolution from the initial position of the off-centered pin 34, in the opposite direction thereto at a progressively increasing speed while it is rotating from one-fourth revolution to one-half revolution, and still in the opposite direction again at a progressively decreasing speed between from one-half to three-fourth revolution.

Accordingly, when assuming the off-centered pin 36 to be immobile, the pivot pin 38 will move substantially linearly in the same direction as the off-centered pin 36 as supposed mobile at a progressively decreasing speed till the input shaft 31 makes one-fourth revolution, in the opposite direction thereto at a progressively increasing speed while it is rotating from one fourth revolution to one-half revolution, and still in the opposite direction again at a progressively decreasing speed between from one-half to three fourth revolution, whereas the lower end of the swing arm 41 will move substantially linearly in the same direction as the pivot pin 38 at a correspondingly varying speed. Moreover, when assuming the pivot pin 38 to be immobile, the off-centered pin 36 will move to either the left or right at a varying speed and, pursuant thereto, the lower end of the swing arm 41 will be moved in the opposite direction to the off-centered pin 36 at a correspondingly varying speed.

Figure 4:
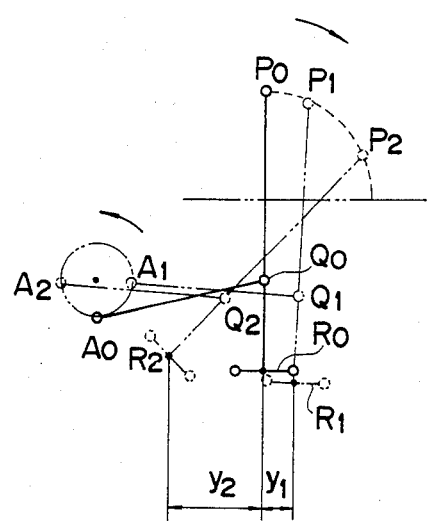
FIG. 4 is a model illustration for explaining the function of the rear wheel steering gear assembly of FIG. 2.

Referring now to FIG. 4 showing the above-described swing motion of the arm 41 in the form of a model illustration, designated at reference character A is the off-centered pin 34 of the drive gear 33, P and Q are the off-centered pin 36 and the pivot pin 38 as the upper and lower fulcrums of the arm 41, respectively, and R is the center point between the inner ends of the left and right tie rods 13, 13. Represented by suffix "0" are respective posiitons as the input shaft 31 is put in the initial posiiton, "1" are those as it has come to the position of one-fourth counterclockwise revolution as viewed from behind, and "2" are those at its three-fourth counterclockwise revolution. Moreover, $y_1$ is the maximum displacement of the center point R as the rear wheels 16, 16 are steered in the same direction as the front wheels 6, 6 and $y_2$ is that as they are steered in the opposite direction to the front wheels 6, 6, while the front wheels 6, 6 are steered to the left by an angle proportional to the revolution of the input shaft 31 which is arranged so as to rotate in the same direction as the steering wheel 1 in this embodiment.

In this respect, to determine the rotating direction of the input shaft 31 to be in accord with that of the steering wheel 1, in the front wheel steering gearbox 20, the driven pinion is arranged so as to mesh from above with the rack on the rack shaft 21. There may be employed an arrangement having an idle gear interposed between an output shaft and a driven pinion meshing from below with a rack on a rack shaft. It will be apparent that the driven gear 35, which is meshed with the drive gear 33 secured to the input shaft 31, rotates in the opposite direction to the steering shaft 2.

As will be seen from FIG. 4, the rear wheels 16, 16, which are to be turned to the left when the tie rods 13, 13 are caused to move rightwardly, will be steered in the same direction as the front wheels 6, 6 at a positive angular acceleration till the input shaft 31 makes one-fourth revolution and at a negative angular acceleration after it has passed one-fourth revolution. Then, they will once return to their initial positions between one-fourth revolution and one-half revolution of the input shaft 31 and, thereafter, will be steered in the opposite direction to the front wheels 6, 6 till three-fourth revolution thereof. Finally, three-fourth revolution of the input shaft 31 will make the maximum displacement $y_2$ of the center point R, thereby transversely turning the rear wheels 16, 16 to the maximum steered angle thereof in the opposite direction to the front wheels 6, 6. This maximum displacement $y_2$ is larger than the maximum displacement $y_1$ by which, at one fourth revolution of the input shaft 31, the rear wheels 16, 16 will be turned to the maximum steered angle thereof in the same direction as the front wheels 6, 6, i.e., $y_2 > y_1$.

As a result, according to the first embodiment of the invention, the steering of the rear wheels is able to follow a steering function such as represented by a curve $C_3$ of FIG. 3, which is the sum of the sine curve $C_1$ and the parabolic curve $C_2$. Moreover, the maximum steered angle of the rear wheels as steered in the same direction as the front wheels is rendered different from that when the rear wheels are steered in the opposite direction thereto, whereas the former is proportional to the maximum linear displacement $y_1$, and the latter, to the maximum linear displacement $y_2$.

In the first embodiment, there is employed a rear wheel steering gear assembly including a drive gear disposed at a position somewhat leftwardly removed from an imaginary half-cut plane, extending longitudinally and vertically, of a vehicle body and a driven gear having its axis of rotation in alignment with a horizontal line on the imaginary half-cut plane.

To the contrary, there may be employed a modified rear wheel steering gear assembly in which a relatively small drive gear has its axis of rotation aligned with a horizontal line on such an imaginary half-cut plane of a vehicle body and a relatively large driven gear is disposed at a position somewhat leftwardly distant from the imaginary half-cut plane, while the gear ratio therebetween is again set equal to 4.

Figure 5:
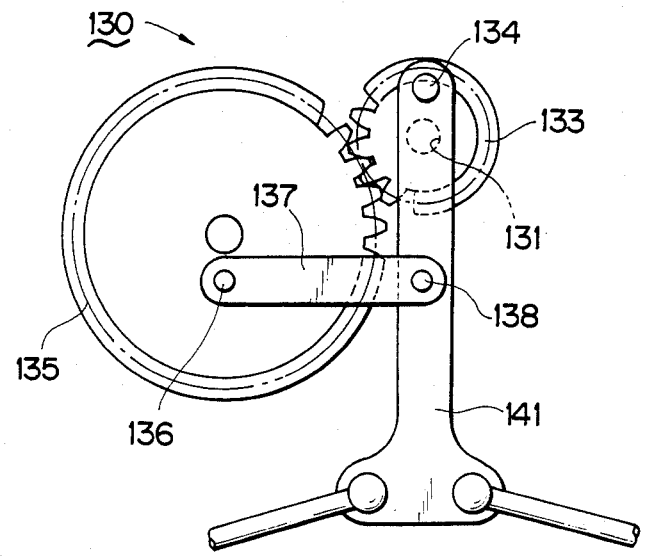
FIG. 5 is a rear view of a rear wheel steering gear assembly as a modified example of that of FIG. 2.

Referring now to FIG. 5, generally designated at reference character 130 is such a rear wheel steering gear assembly. The rear wheel steering gear assembly 130 has a drive gear 133 provided with an off-centered pin 134, which is initially positioned right above an input shaft 131, and a driven gear 135 provided with an off-centered pin 136, which is initially positioned right below the axis of rotation of the driven gear 135. Moreover, there is provided a swing arm 141 pivotally supported at two vertically spaced points, namely, by the off-centered pin 134 of the drive gear 133 and by a pivot pin 138 at the right end of a connecting rod 137 pivoted at the left end thereby on the off-centered pin 136 of the driven gear 135.

According to this modified example, an upper fulcrum or the off-centered pin 134 and a lower fulcrum or the pivot pin 138 have functions similar to those of the lower fulcrum and the upper fulcrum in the first embodiment, respectively.

It will be understood that, in the foregoing first embodiment and the modified example thereof, the gear ratio between a drive gear and a driven gear is not restricted to 4, but may take any other suitable value.

Referring now to FIG. 6 showing a second embodiment of the invention, designated at reference character 201 is a steering wheel. The steering wheel 201 is provided with a steering shaft 202 assembled at the distal end thereof in a front wheel steering gearbox 220 of a rack and pinion type. In the gearbox 220, the steering shaft 202 has at the distal end thereby a drive pinion (not shown) secured thereto and engaged with the right-half part of a rack (not shown) formed on a rack shaft 221. The rack shaft 221 is projected at either end thereof from both sides of the front steering gearbox 220 and connected to respective inner ends of a pair of tie rods 203, 203 each connected at the outer end thereof to one of a pair of knuckle arms 204, 204 which have their axle shafts 205, 205 projecting outwardly and respectively supporting a pair of front wheels 206, 206.

The steering of the front wheels 206, 206 is effected by operating the steering wheel 201. As the steering shaft 202 rotates with the steering wheel 201, the steering rotation is converted, through the engagement between the drive pinion and the rack, into a transverse movement of the rack shaft 221 with respect to the gearbox 220, which makes, through the tie rods 206, 206, the knuckle arms 204, 204 turn transversely, thereby steering the front wheels 206, 206.

The rack is further engaged at the left half part thereof with a driven pinion (not shown) constituting an angle take-out mechanism with a pinion shaft 222 to which the driven pinion is secured. The pinion shaft 222, projecting rearwardly from the gearbox 220, is connected at the rear end thereof through a universal joint 223 to the front end of a first link shaft 224, the rear part of which is inserted in a casing 241 of a later described ratioshift mechanism 240 constituting a function generating mechanism, together with a later described rear wheel steering crank mechnaism 250, for generating a compound function as the combination of a set of various sine functions with a select function. Further, there is provided a second link shaft 225, the front part of which is also inserted in the casing 241 coaxially with the first link 224, and the rear end of which is connected through another universal joint 226 to the front end of a relatively long third link shaft 227.

The above linkage consisting of the pinion shaft 222 and the first, second and third link shafts 224, 225 and 227 has an output end thereof, that is, the rear end of the third link shaft 227 connected through still another universal joint 228 to the front end of an input shaft 231 of the rear wheel steering crank mechanism 250 The input shaft 231 is a rotatable member supported by a bearing bracket 232 and arranged in alignment with the longitudinal center line of a vehicle body (not shown). Moreover, the input shaft 231 has at the rear end thereof a crank arm 233 secured thereto and provided on the back thereof with an off-centered crank pin 234 projecting rearwardly therefrom, the crank pin 234 being initially set so as to extend right downward of the input shaft 231 when the steering wheel 201 is in its initial or neutral position. The crank pin 234 commonly supports left and right tie rods 213, 213, as a pair of output members of the crank mechanism 250, loose-fitted thereon at their inner ends and each connected at the outer end thereof to one of a pair of knuckle arms 214, 214 which have their axle shafts 215, 215 projecting outwardly and respectively supporting a pair of rear wheels 216, 216.

Figure 7:
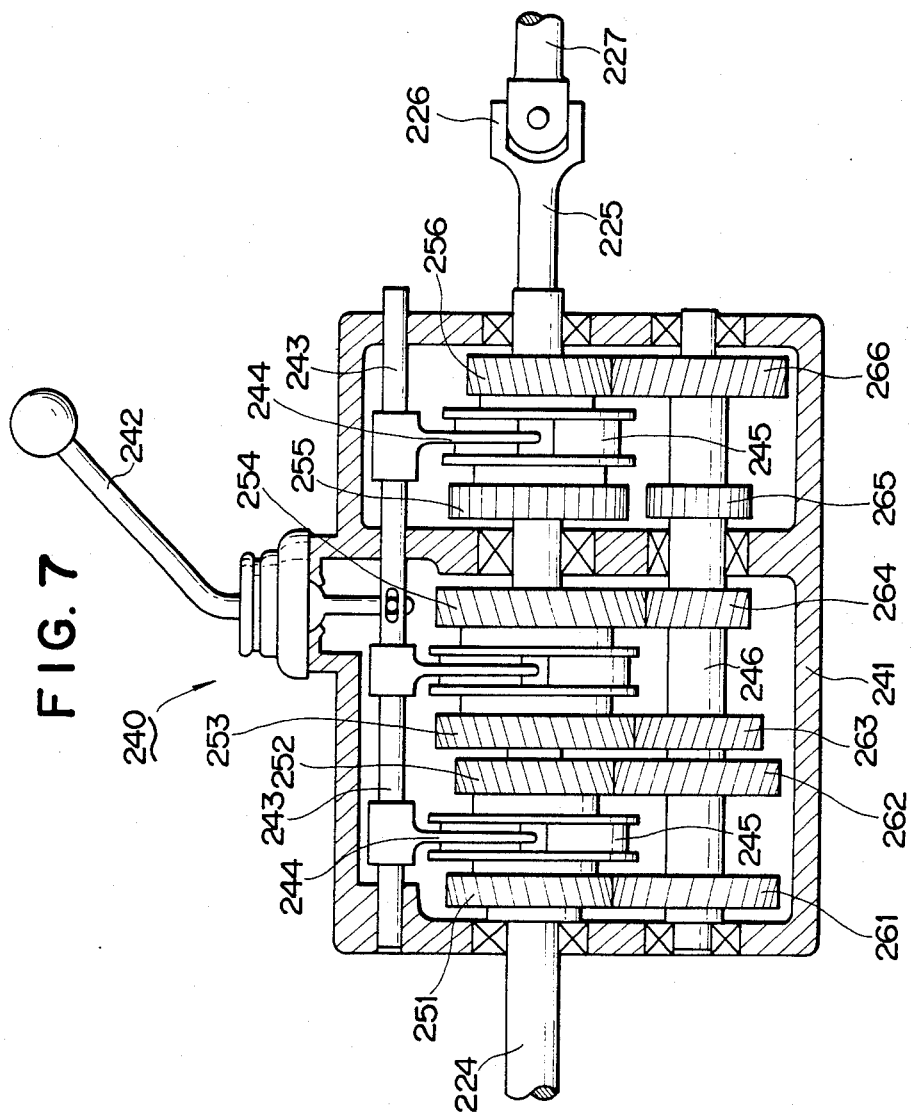
FIG. 7 is an enlarged longitudinal sectional view of a ratio-shift mechianism of the steering system of FIG. 6.

Referring now to FIG. 7 showing the inner structure of the ratio-shift mechnaism 240 of a manual shift type, designated at reference numeral 242 is a shift lever arranged at a proper position in a pasenger area of the vehicle. The shift lever 242 is operatively connectable at the lower end to any of a plurality of shift rods 243 in the casing 241, to selectively fit some of a plurality of shift forks 244, which are arranged to be carried by the shift rods 243, onto some of a plurality of shift sleeves 245, thereby alternatively bringing advance drive gears 251 to 254 of first to fourth ratios and a reverse drive gear 255 on the first link shaft 224 into engagement with advance driven gears 261 to 264 and a reverse driven gear 265 on a countershaft 246, respectively. Then, when an angular displacement is taken out from the front steering gearbox 220, the corresponding rotation of the first link shaft 224 as a drive shaft will be transmitted to the second link shaft 225 as a driven shaft, through gears 266 and 256, at a desired gear ratio due to the above selective engagement effected with the shift lever 242 adapted to be operated by a driver.

The function of the ratio-shift mechanism 240 will be described below.

When the steering wheel 201 is operated to be steered, the rack shaft 221 will transversely move through the front wheel steering gearbox 220. Accordingly, through the pinion shaft 222 rotating wih the driven pinion engaged with the left-half part of the rack, there will be taken out the angular displacement to thereby rotate the first link shaft 224.

In this respect, to determine the rotating direction of the first link shaft 224 to be in accord with that of the steering wheel 201, in the front wheel steering gearbox 220, the driven pinion is arranged so as to mesh from above with the rack on the rack shaft 221. There may be employed an arrangement having an idle gear interposed between an output shaft and a driven pinion meshing from below with a rack on a rack shaft. It will be apparent that the second link shaft 225 will rotate in the same direction as the steering wheel 201 when one of the advance drive gears 252 to 254 is brought into engagement with a corresponding one of the driven gears 262 to 264, and in the reverse direction when the reverse drive gear 255 is engaged with the driven gear 265.

Further, the crank pin 234, which is secured through the crank arm 233 to the input shaft 231 of the rear wheel steering crank mechanism 250, will be rotated through the third link shaft 227 in the same direction as the second link shaft 225. Consequently, the crank pin 234 will have a transverse displacement thereof increasing at a progressively decreasing rate while it is rotating from the initial position to one-fourth revolution, thereby transversely carrying the tie rods 213, 213, which are commonly loose-fitted on the crank pin 234. To the contrary, in the subsequent rotation of the crank pin 234 from one-fourth to one-half revolution, the transverse displacement will be decreased at an increasing rate, to thereby return the tie rods 213, 213 to the initial position. Then, in the rotation from one-half to three-fourth revolution, the displacement will be increased in the opposite direction at a decreasing rate, thus carrying the tie rods 213, 213 in the opposite direction relative to the direction of initial movement.

Figure 8:
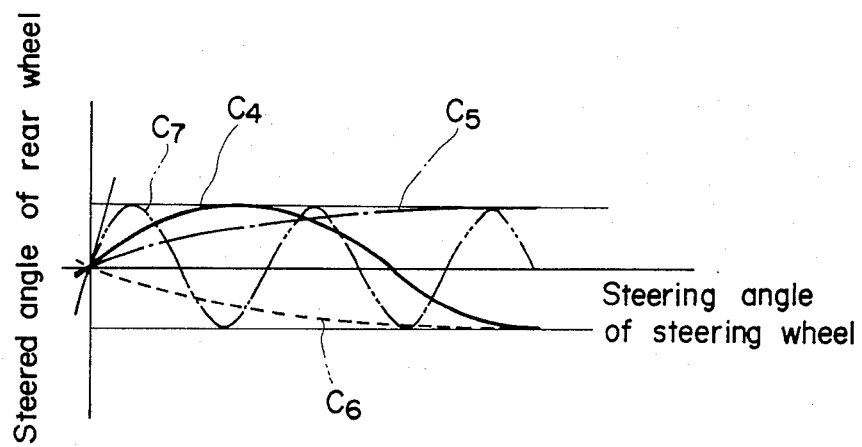
FIG. 8 is a graph for the explanation of a compound function generated by the ratio-shift mechanism of FIG. 7.

The ratio-shift mechanism 240 is now supposed to have an ordinary engagement state, in which the third ratio gear 253 is engaged, for use in the normal operation of the vehicle. Then, as will be understood from the foregoing description, in the ordinary engagement state, the rear wheels 216, 216 will be steered as shown by a sine curve $C_4$ of FIG. 8, in which the ordinate represents a steered angle of rear wheel and the abscissa represents a steering angle of steering wheel. Moreover, when the shift lever 242 is operated for the engagement of the first ratio gear 251, the rear wheels 216, 216 will be steered as shown by a sine curve $C_5$ with a relatively long period. In this respect, in the engagement of the reverse gear 255, the steering of the rear wheel 216, 216 will be as shown by a reversed sine curve $C_6$ of a similarly long period relative to the curve $C_5$. Therefore, in operation at relatively low speeds including extremely low speeds, the turning maneuverability of the vehicle is able to be raised as circumstances require such as when parallel parking as well as when turning along narrow curves and when driving in and out of a parking space. Further, for travelling at relatively high speeds, in which the steering angle of the steering wheel 201 is generally limited within a relatively small range about the initial position, when the fourth ratio gear 254 is brought into engagement, the rear wheel 216, 216 will be steered as shown by a sine curve $C_7$ with a relatively short period, thus increasing the ratio of the steered angle to the steering angle near the initial position of the steering wheel 201 where the steering direction of the rear wheels 216, 216 is the same as that of the front wheels 206, 206, thereby correspondingly raising the drivability of the vehicle in the high speed range. The effect of the second ratio gear 252 will be easily understood, though not given in the above description. It will also be apparent that the shift operation of the ratio-shift mechanism 240 is favorably effected when the vehicle is moving substantially straight. Incidentally, in a neutral state of the ratio-shift mechanism 240, no transmission route is established between the first and second link shafts 224, 225.

In this second embodiment of the invention, there is employed a ratio-shift mechanism comprising a 4-staged advance, 1-staged reverse shift gearing. However, respective numbers of stages for advance and reverse shift operations may be otherwise determined in a selectively manner. As a matter of course, there may be employed a ratio-shift mechanism of any other suitable type, such as a belt drive type.

Moreover, in the steering system according to the second embodiment, there is employed a rear wheel steering sub-system including, besides a ratio-shift mechanism of a manual shift type, a rear wheel steering crank mechanism for steering rear wheels, depending on the steering angle of a steering wheel, in the same direction as front wheels for relatively small steering angles and in the opposite direction thereto for relatively large steering angles. In this respect, there may be employed another type of rear wheel steering sub-system including, besides a manual type ratio-shift mechanism, a rear wheel steering mechanism for steering rear wheels as well as front wheels in proportion to the steering angle of a steering wheel.

Referring now to FIG. 9 showing another example of a steering sub-system according to the second embodiment, the same reference numerals as those of FIG. 6, except for the first digit 3, designate similar parts.

A third link shaft 327 is connected at the rear end thereof through a universal joint 328 to the front end of an input shaft 331 assembled at the rear part thereof in a rear wheel steering gearbox 370 of a rack and pinion type. In the gearbox 370, the input shaft 331 has at the rear end thereof a drive pinion (not shown) secured thereto and engaged with a rack (not shown) formed on a rack shaft 371. The rack shaft 371 is projected at either end thereof from both sides of the rear steering gearbox 370 and connected to the inner ends of a pair of tie rods 313, 313, so that a pair of rear wheels 316, 316 are steerable, as well as a pair of front wheels 306, 306, in proportion to the steering angle of a steering wheel 301 by means of a rack and pinion mechanism having the input shaft 331 and the rack shaft 371.

Figure 10:
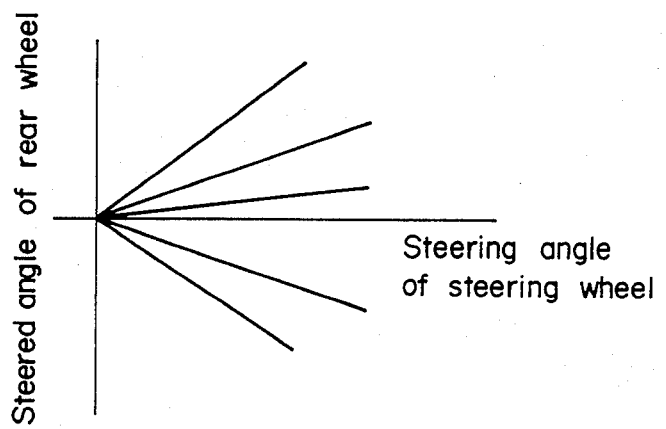
FIG. 10 is a graph for the explanation of a compound function generated by a ratio-shift mechanism of the steering system of FIG. 9.

Also in this example of the second embodiment, a ratio-shift mechanism 340 of a manual shift type is interposed between first and second link shafts 324, 325, the ratio shift mechanism 340 constituting a function generating mechanism for generating a compound function as the combination of a select function and a set of such first-order functions as shown by straight lines in FIG. 10, in which the ordinate represents a steered angle of rear wheel and the abscissa represents a steering angle of steering wheel.

In the foregoing second embodiment, a ratio-shift mechanism is interposed between first and second link shafts. In this respect, the interposition of a manual shift type ratio-shift mechanism between two linkage members is essential.

Figure 11:
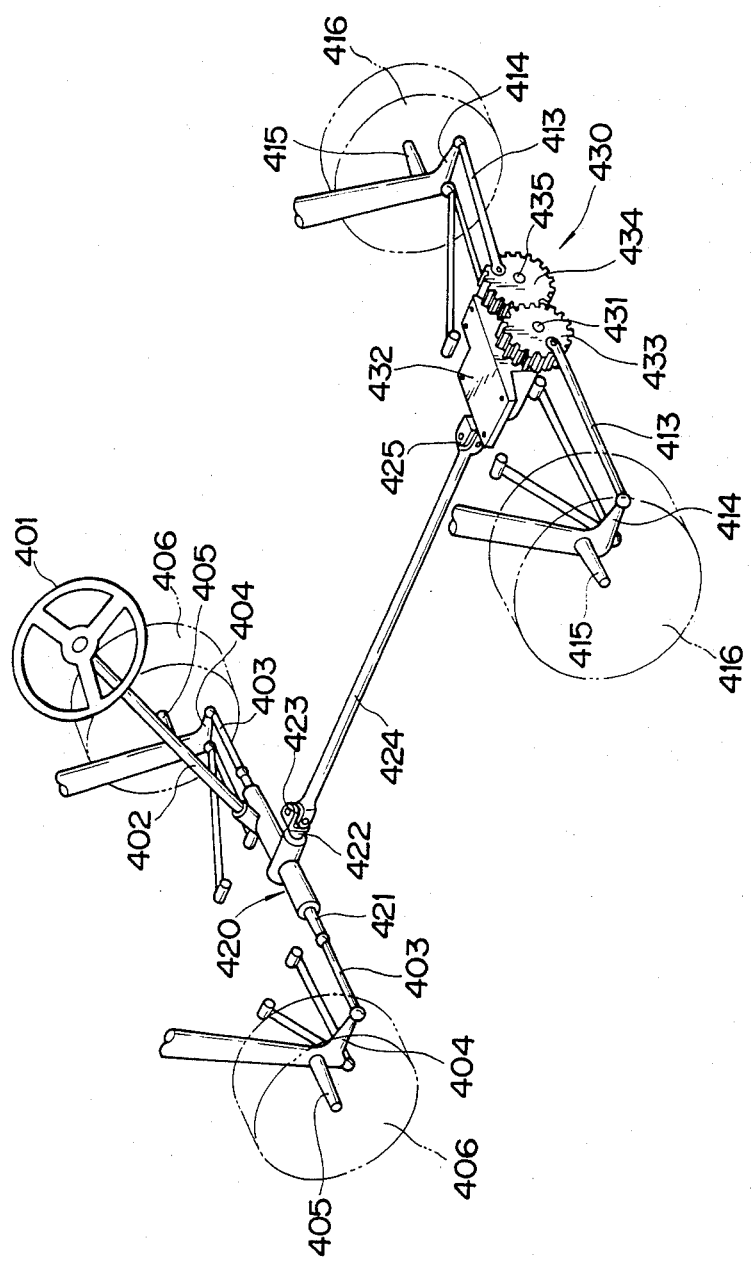
FIG. 11 is a perspective view of a steering system for vehicles according to a third embodiment of the invention.
Figure 12:
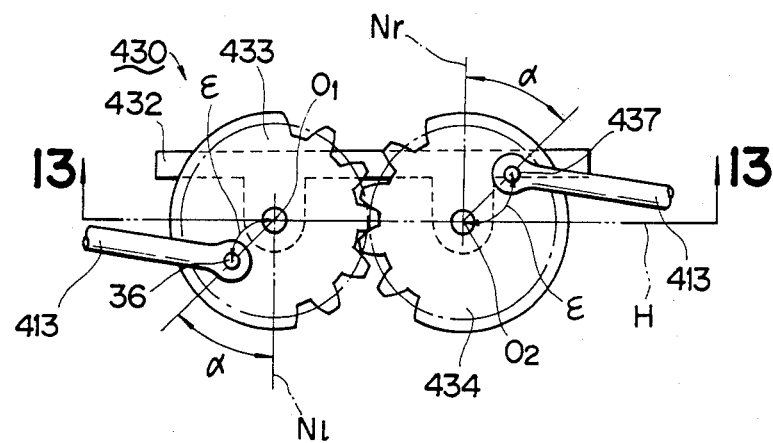
FIG. 12 is an enlarged rear view of a rear wheel steering gear assembly of the steering system of FIG. 11.
Figure 13:
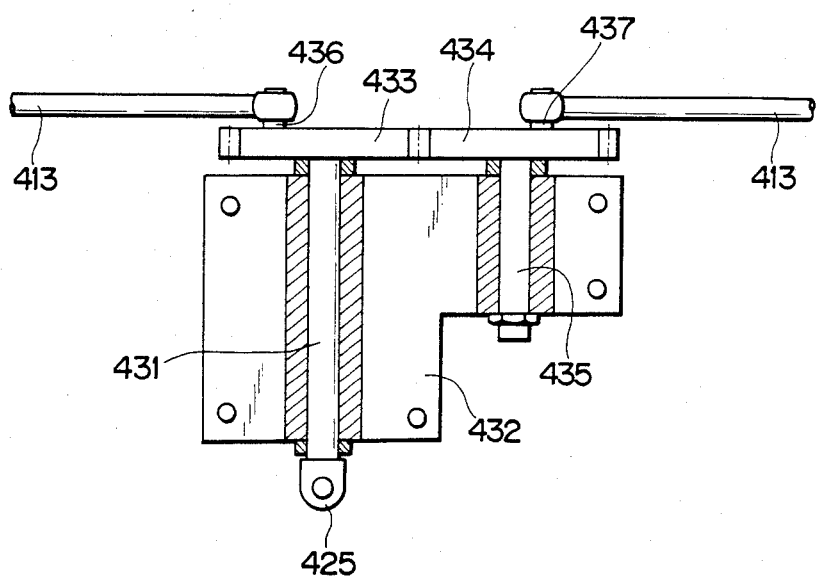
FIG. 13 is a cross sectional view taken along line 13—13 of FIG. 12.

Referring now to FIGS. 11 to 13 showing a third embodiment of the invention, designated at reference numeral 401 in FIG. 11 is a steering wheel. The steering wheel 401 is provided with a steering shaft 402 assembled at the distal end thereof in a front wheel steering gearbox 420 of a rack and pinion type. In the gearbox 420, the steering shaft 402 has at the distal end thereof a drive pinion (not shown) secured thereto and engaged with the right half part of a rack (not shown) formed on a rack shaft 421. The rack shaft 421 is projected at either end thereof from both sides of the front steering gearbox 420 and connected to respective inner ends of a pair of tie rods 403, 403 each connected at the outer end thereof to one of a pair of knuckle arms 404, 404 which have their axle shafts 405, 405 projecting outwardly and respectively supporting a pair of front wheels 406, 406.

The steering of the front wheels 406, 406 is effected by operating the steering wheel 401. Namely, as the steering shaft 402 rotates with the steering wheel 401, the steering rotation is converted, through the engagement between the drive pinion and the rack, into a transverse movement of the rack shaft 421 with respect to the gearbox 420, which makes, through the tie rods 406, 406, the knuckle arms 404, 404 turn transversely, thereby steering the front wheels 406, 406.

The rack is further engaged at the left half part thereof with a driven pinion (not shown) constituting an angle take-out mechanism with a pinion shaft 422 to which the driven pinion is secured. The pinion shaft 422, projecting rearwardly from the gearbox 420, is connected at the rear end thereof through a universal joint 423 to the front end of a relatively long link shaft 424 which is further connected at the rear end thereof through a universal joint 425 to the front end of an input shaft 431 of a rear wheel steering gear assembly 430 constituting a function generating mechanism for generating a compound function of an angular displacement to provide two transverse linear displacements, the compound function being the sum of a sine function and a function of substantially first order, as later described. The input shaft 431 is a rotatable member supported by a bearing bracket 432 and disposed in the rear part of a vehicle body (not shown) at a position somewhat leftwardly distant from an imaginary half-cut plane, extending longitudinally and vertically, of the vehicle body.

The rear wheel steering gear assembly 430 has a drive gear 433 secured to the rear end of the input shaft 431, the drive gear 433 meshing from the left with a driven gear 434 with a gear ratio of 1:1. The driven gear 434 is provided with a shaft 435 disposed at a position somewhat rightwardly distant from the imaginary half-cut plane of the vehicle body and supported in parallel with the input shaft 431 by the bearing bracket 432.

The drive and driven gears 433 and 434 each pivotally support at the rear face thereof either of the inner ends of left and right tie rods 413, 413 as a pair of output members of the rear wheel steering gear assembly 430, and have their axes of rotation $O_1$, $O_2$ arranged parallel on an imaginary horizontal plane H as shown in FIG. 12, which provides an initial or neutral state of the gear assembly 430, when the drive and driven gears 433, 434 as well as the steering wheel 401 are in their initial positions.

The drive gear 433 has on the rear face thereof a pin 436 projected therefrom and offset by a distance $\epsilon$ with respect to the axis $O_1$. In the initial state, the pin 436 is positioned under the horizontal plane H and biased by an angle $\alpha$ clockwise in FIG. 12 from a vertical line $N_l$ passing through the axis $O_1$. Likewise, the driven gear 434 has on the rear face thereof another pin 437 projected rearwardly therefrom and offset by the same distance $\epsilon$ with respect to the axis $O_2$. In the initial state, however, the pin 437 is positioned above the horizontal plane H and biased by the same angle $\alpha$ clockwise in FIG. 12 from a vertical line Nr passing through the axis $O_2$. The left and right tie rods 413, 413 are pivoted at the inner ends thereof on the off-set pin 436 of the drive gear 433 and the off-set pin 437 of the driven gear 434, respectively.

The left and right tie rods 413, 413 are further connected at the outer ends thereof to left and right knuckle arms 414, 414 which hav e their axle shafts 415, 415 projecting outwardly and supporting left and right rear wheels 416, 416, respectively.

When the steering wheel 401 is operated to be steered, the rack shaft 421 will transversely move through the front wheel steering gearbox 420. Accordingly, through the pinion shaft 422 rotating with the driven pinion engaged with the left half part of the rack, there will be taken out the angular displacement to thereby rotate, through the link shaft 424, the input shaft 431 of the rear wheel steering gear assembly 430.

Figure 14A:
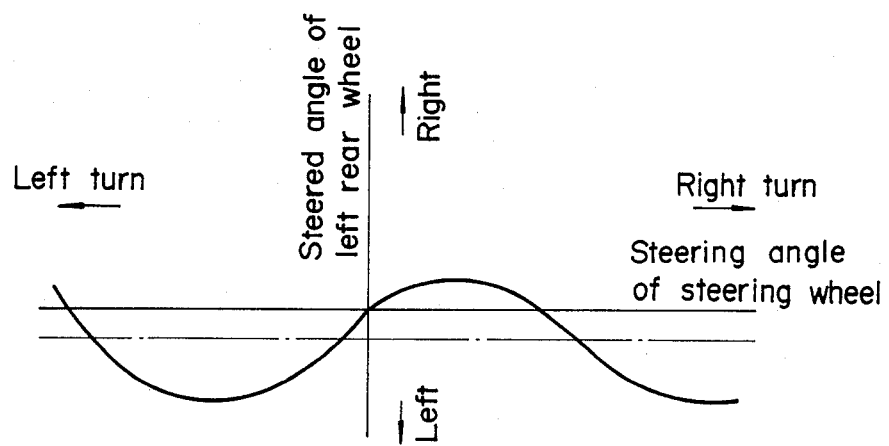
FIGS. 14(a) and 14(b) are graphs for the explanation of a compound function generated at the rear wheel steering gear assembly of FIG. 12.
Figure 14B:
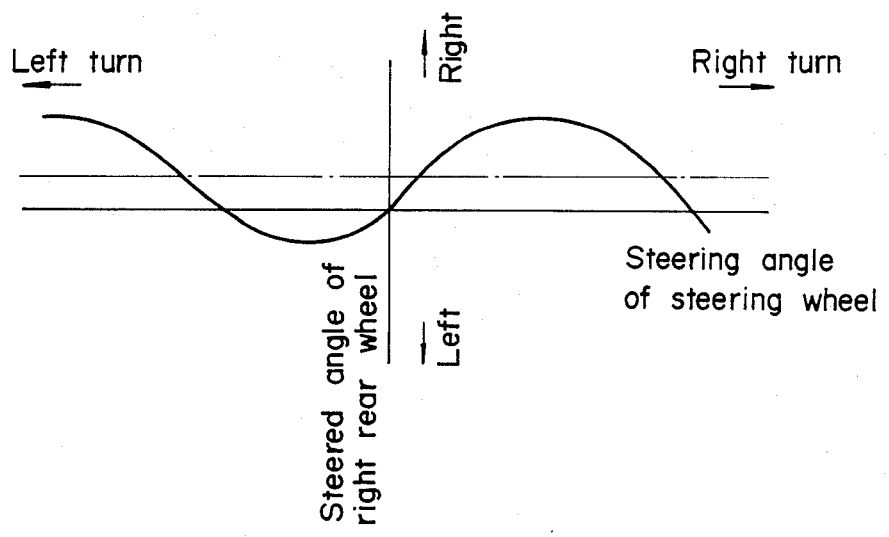

As the input shaft 431 rotates, the drive gear 433 secured thereto will rotate to either the left or right together with the driven gear 434 meshed therewith to rotate in the opposite direction. With the rotation of these gears 433, 434, the off-set pins 436, 437 will be rotated in a crank manner in opposite directions relative to each other. As the pins 436, 437 are initially biased by the angle $\alpha$ symmetrically about the meshing point between the gears 433, 434, the rear wheels 416, 416 will be steered, through the tie rods 413, 413 and the knuckle arms 414, 414, with their functions of steered angle being different from each other. Namely, in correspondence to the steering direction of the steering wheel 401 to either the left or right, the left and right rear wheels 416, 416 will be steered as shown in FIG. 14(a), in which the ordinate represents a steered angle of left rear wheel and the abscissa represents a steering angle of steering wheel, and in FIG. 14(b), in which the ordinate represents a steered angle of right rear wheel and the abscissa represents a steering angle of steering wheel, respectively.

For example, when the steering wheel 401 is steered to the right, with the left rear wheel 416 to be the outer rear wheel with respect to the resulting right turn of the vehicle, the left rear wheel 416 will be steered to the left, that is, the opposite direction relative to the front wheels 406, 406, more than to the right, thereby contributing correspondingly to the right turn of the vehicle. On the other hand, the rear wheel 416 as the inner rear wheel will be left moderate with respect to the contribution to such turning of the vehicle. In the leftward steering of the steering wheel 401, such effects will be reversed relative to the direction.

According to this third embodiment of the invention, therefore, the maximum steered angle of either rear wheel as located at the outside with respect to the turning of the vehicle and as steered in the opposite direction to the front wheels becomes larger than when the rear wheel is steered in the same direction as the front wheels. In other words, the outer rear wheel having a large effect on the turning of the vehicle can be steered with a compound function favorable for the turning of the vehicle.

In the third embodiment, there is favorably employed a rear wheel steering gear assembly of a rotator mechanism comprising a pair of gears and a pair of offset pins. In this connection, there may be employed a modified example comprising triple gearings, a pair of chained sprocket mechanisms, or a pair of pulley mechanisms connected by an endless running member such as a belt or wire.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrective. The scope of the invention is indicated by the appended claims rather than by the foregoing description.

We claim:

1. A steering system for a vehicle having front and rear wheels, comprising:
 a steering wheel;
 a front wheel steering sub-system for steering said front wheels in accordance with the steering angle of said steering wheel;
 an angle take-out mechanism for taking out from said front wheel steering sub-system an angular displacement according to the steering of said steering wheel;
 a pair of rear wheel turning mechanisms for respectively turning said rear wheels in accordance with two linear displacements, respectively, substantially in the transverse direction of said vehicle; and
 function generating means for generating a compound function of said angular displacement to determine said linear displacements, said compound function being such that the direction of each said linear displacement in a relatively small steering angle range of said steering wheel is opposite to that in a relatively large steering angle range of said steering wheel and the maximum absolute value of the function in said small steering angle range is less than that in said large steering angle range.

2. A steering system according to claim 1, wherein:
 said two linear displacements are equal to each other; and
 said compound function is the sum of a sine function and a function of second order.

3. A steering system according to claim 1, wherein:
 said two linear displacements are equal to each other; and
 said compound function is the compound of a set of sine functions with a select function.

4. A steering system according to claim 1, wherein:
 said two linear displacements are equal to each other; and
 said compound function is the compound of a set of functions of first order with a select function.

5. A steering system according to claim 1, wherein:
 said two linear displacements have a predetermined difference therebetween; and
 said compound function is the sum of a sine function and a function of first order.

6. A steering system according to claim 1 or 2, wherein:
 said function generating means comprises a drive gear provided with a first off-centered pin, said drive gear rotating by said angular displacement, a driven gear provided with a second off-centered pin, a connecting rod pivoted at either end thereof on said first off-centered pin, and a swing arm pivoted at either end thereof on said second off-centered pin and at a longitudinally intermediate point thereof on the other end of said connecting rod, said swing arm providing at the other end thereof said linear displacements.

7. A steering system according to claim 1 or 3, wherein:
 said function generating means comprises a ratio-shift mechanism for manually shifting the change ratio of said angular displacement and a crank mechanism for converting said angular displacement as shifted into said linear displacements.

8. A steering system according to claim 1 or 4, wherein:
 said function generating means comprises a ratio-shift mechanism for manually shifting the change ratio of said angular displacement and a rack and pinion mechanism for converting said angular displacement as shifted into said linear displacements.

9. A steering system according to claim 1 or 5, wherein:
 said function generating means comprises a pair of rotary members interconnected to each other and each arranged to be rotatable by said angular displacement, and a pair of pivot members fixed to said rotatory members in a symmetrically offset manner, said pivot members providing said two linear displacements.

* * * * *